United States Patent [19]
Sugiyama et al.

[11] 4,308,167
[45] Dec. 29, 1981

[54] PROCESS FOR GASIFYING HYDROCARBONS

[75] Inventors: Hiroshi Sugiyama; Tsuyoshi Mitani, both of Sodegaura, Japan

[73] Assignees: Idemitsu Kosan Co., Ltd., Tokyo; Kyusyu Refractories Co., Ltd., Bizen, both of Japan

[21] Appl. No.: 167,756

[22] Filed: Jul. 14, 1980

Related U.S. Application Data

[63] Continuation of Ser. No. 15,796, Feb. 27, 1979, abandoned.

[30] Foreign Application Priority Data

Mar. 20, 1978 [JP] Japan .................................. 53-31138

[51] Int. Cl.$^3$ ............................................. C01B 2/10
[52] U.S. Cl. .................................. 252/373; 48/214 A; 252/463
[58] Field of Search ...................... 252/373; 48/214 A

[56] References Cited

U.S. PATENT DOCUMENTS 2,682,459  6/1954  Stanier .
3,957,681  5/1976  Tomita et al. .
3,989,481  11/1976  Kunii et al.

FOREIGN PATENT DOCUMENTS 49-126590  4/1974  Japan .

Primary Examiner—Howard T. Mars
Attorney, Agent, or Firm—Frishauf, Holtz, Goodman & Woodward

[57] ABSTRACT

A process for gasifying liquid and solid hydrocarbons by contact at elevated temperature with a novel hydrocarbon gasifying catalyst comprising $K_2O$—$CaO$—$Al_2O_3$ containing from about 5 to 15% by weight $K_2O$, from about 0.1 to 7% CaO, and from about 78 to 94.9% $Al_2O_3$.

8 Claims, No Drawings

PROCESS FOR GASIFYING HYDROCARBONS

This is a continuation, of application Ser. No. 15,796 filed Feb. 27, 1979 now abandoned.

BACKGROUND OF THE INVENTION

This invention relates to a process for gasifying hydrocarbons, and more particularly to a process for gasifying hydrocarbons using a catalyst composed of $K_2O$—$CaO$—$Al_2O_3$ system which retains high catalytic activity for a long period of time.

Many kinds of catalysts for gasifying hydrocarbons are known, for example, the $K_2O$—$Al_2O_3$ system catalyst (Japanese Patent Publication No. 8521/1972), and the $K_2O$—$CaO$—$Al_2O_3$ system catalyst (Japanese Patent Laid-Open Publication (Kokai) No. 126590/1974). The $K_2O$—$Al_2O_3$ system catalyst is advantageous in that it produces a gas having a large amount of hydrogen. It also prevents the formation of tar because it has high activity for gasifying and can readily split the C—H bond. Said $K_2O$—$Al_2O_3$ catalyst has a number of disadvantages, i.e., the potassium is readily volatilized at high temperature, and its activity is not retained for long periods of service. The $K_2O$—$CaO$—$Al_2O_3$ system catalyst produces a gas having a high calorific value and also prevents the formation of coke because it can easily split the C—C bond. However, because it cannot prevent the formation of tar which causes piping to be clogged, it is difficult to use this type of catalyst in practice.

We carried out extensive studies to develop an excellent catalyst in which the above-mentioned advantages of the $K_2O$—$Al_2O_3$ system catalyst and the $K_2O$—$CaO$—$Al_2O_3$ system catalyst are retained but the disadvantages thereof are eliminated.

THE INVENTION

The present invention provides a process for gasifying hydrocarbons using a catalyst which comprises from 5 to 15 percent by weight of $K_2O$, from 0.1 to 7 percent by weight of CaO, and from 78 to 94.9 percent by weight of $Al_2O_3$.

When the $K_2O$ content is less than 5 percent by weight, the gasifying activity of the catalyst is insufficient. When it exceeds 15 percent by weight, the mechanical strength of the catalyst decreases, and volatilization of potassium increases during the reaction, thereby causing piping to become clogged with potassium carbonate.

The CaO content of the catalyst used in the process of the present invention is low compared with that of the conventional catalyst, that is, from 0.1 to 7 percent by weight, preferably 0.5 to 5 percent by weight, more preferably from 1 to 3 percent by weight. When the CaO content is less than 0.1 percent by weight, the catalyst does not retain its activity for an extended period of time and thus enhances the formation of coke, resulting in clogging of piping. When the CaO content exceeds 7 percent by weight, the mechanical strength of the catalyst decreases, and the formation of tar is enhanced.

In the catalyst used in the process of the present invention, $Al_2O_3$ functions as an active component and also functions as a carrier. The $Al_2O_3$ content is large compared with those of other components, that is, from about 78 to 94.9 percent by weight.

The liquid and solid hydrocarbons that can be gasified by the process of the present invention vary from light to heavy hydrocarbons without any particular limitation. The process of the present invention is particularly effective for such hydrocarbons as heavy oils, finely powdered coal, etc. Such heavy oils include, for example, crude oil, reduced crude, vacuum distillate, vacuum residue, thermally cracked pitch, propane deasphalted asphalt, coal tar, coal tar pitch, and mixtures thereof.

In preparing the catalyst used in the process of the present invention, any known method can be employed, and no special operation is required.

For example, predetermined amounts of $K_2CO_3$ and $Al(OH)_3$ are kneaded (mixed) with addition of water, then the thus kneaded mixture is calcined, and then pulverized. Predetermined amounts of this pulverized product and $CaSO_4$ are mixed with addition of water, and the mixture is compressed into pellets. The pellets are then dried, calcined and pulverized to produce a $K_2O$—$CaO$—$Al_2O_3$ system catalyst of a suitable particle size which can be used in the process of the present invention.

Various processes can be used to gasify the aforementioned hydrocarbons using the catalyst prepared as described above. It is most effective to employ the fluid catalytic cracking process. This process permits operation while maintaining a uniform temperature inside of the reaction apparatus and accomplishes the decomposition reaction smoothly, thereby ensuring safe operation without the risk of explosion. Hydrocarbon gasifying processes including the fluid catalytic cracking processes of the type disclosed in the present application are well-known; see, for example U.S. Pat. No. 4,089,798 and PETROLEUM REFINERY ENGINEERING by W. L. NELSON, CHAPTER 21, published by McGRAW-HILL BOOK COMPANY, INC. The fluid catalytic cracking process using the catalyst of the present invention is accomplished under relatively mild conditions, that is, the reaction temperature is from 650° to 950° C., preferably from 700° to 900° C., and the pressure is from 0 to 10 kg/cm² (gauge), preferably from 0 to 5 kg/cm² (gauge). Further, time for contacting the hydrocarbon feed and the catalyst is less than 10 seconds, preferably less than 5 seconds, more preferably about 1 second, and the weight ratio of steam to hydrocarbon is from 0.5 to 5.0, preferably from 1.0 to 3.0.

When gasification of the hydrocarbon is conducted using the catalyst prepared as described hereinbefore, gas can effectively be produced which contains a large amount of hydrogen, because the catalyst has high activity and can retain this high activity for a long time. Further, it becomes possible to effect long-time safe operation without such problems as clogging of apparatus, because the formation of tar and of excessive coke can be prevented.

Accordingly, the process of the present invention can be widely utilized in the fields of the petroleum refining industry, the petrochemical industry, etc.

The process of the present invention is described in more detail by the following examples.

EXAMPLE 1

Forty parts by weight of $K_2CO_3$, 50 parts by weight of $Al(OH)_3$, and 10 parts by weight of water were kneaded. The mixture was calcined at 110° C. for four hours, and then at 1400° C. for two hours. The thus calcined mixture was then pulverized. Eighty parts by weight of this pulverized product, 10 parts by weight of $CaSO_4$, and 10 parts by weight of water were thoroughly mixed, and the mixture was compressed into pellets under a pressure of 1 t/cm². The pellets were then dried and further calcined at 1000° C. for two hours. The thus calcined product was pulverized to obtain a $K_2O$—$CaO$—$Al_2O_3$ system catalyst having a particle size of from 35 to 65 mesh. Ten kilograms of this catalyst were charged into a two-tower circulating fluid catalytic cracking apparatus, and petroleum pitch (carbon atom/hydrogen atom=1.1) was fed thereto and processed. The reaction was carried out under the following conditions: the feed rate of raw material was 1 kilogram per hour, the feed rate of steam was 2 kilograms per hour, temperature was 800° C., pressure was atmospheric pressure, and contact time was one second. The results are reported in Table 1.

COMPARATIVE EXAMPLE 1

Forty parts by weight of $K_2CO_3$, 50 parts by weight of $Al(OH)_3$, and 10 parts by weight of water were kneaded and then calcined at 110° C. for four hours, and then at 1400° C. for two hours. The thus calcined mixture was pulverized, and 60 parts by weight of this pulverized product, 30 parts by weight of $CaSO_4$, and 10 parts by weight of water were mixed. After that, operation was conducted in the same manner as in Example 1 hereinbefore. The results are reported in Table 1.

COMPARATIVE EXAMPLE 2

Forty parts by weight of $K_2CO_3$, 50 parts by weight of $Al(OH)_3$, and 10 parts by weight of water were kneaded. The mixture was then compressed into pellets under a pressure of 1 t/cm². The thus obtained pellets were dried and further calcined at 1000° C. for two hours. After that, operation was conducted in the same manner as in Example 1 hereinbefore. The results are reported in Table 1.

The amount of gas produced in Example 1 is much larger than in Comparative Example 1. When the amount of gas produced with a fresh catalyst is compared with that with a catalyst that has been used for 1000 hours, there is no substantial difference between them in Example 1, while a marked decrease is noted in Comparative Example 2, in particular. Further, a marked increase in the yield of coke is noted in Comparative Example 2.

(2) Hydrogen content of the product gas

The hydrogen content in Example 1 is much larger than in Comparative Example 1.

(3) Formation of tar

The amount of tar formed in Example 1 is much smaller than in Comparative Example 1.

(4) Formation of coke

In general, the heat balance can be maintained when the yield of coke is from 10 to 30 percent by weight. When this range is exceeded, piping and other parts are easily clogged and, therefore, coke has to be removed by withdrawing the catalyst, which makes the heat loss too large for practical use. From this point of view, in Example 1 the heat balance can be maintained, even after the catalyst has been in use for 1000 hours, while in Comparative Example 2, the yield of coke after 1000 hours of service (use) is so large, trouble such as clogging of piping is easily caused.

As is seen from the foregoing items (1) to (4), the catalyst of the present invention has many advantages.

What is claimed is:

1. In the process for gasifying liquid and solid hydrocarbons, wherein the hydrocarbon is contacted with steam and a gasifying catalyst at elevated temperature, the improvement comprising said gasifying catalyst comprising from about .5 to 15% by weight $K_2O$, from 0.5 to 5% CaO, and from about 78 to 94.9% $Al_2O_3$ in the form of $K_2O$—$CaO$—$Al_2O_3$.

2. The process of claim 1, wherein said catalyst contains from 1 to 3% CaO.

3. The process of claim 1, wherein said hydrocarbon

TABLE 1

| | Example | | Comparative Example 1 | | Comparative Example 2 | |
| --- | --- | --- | --- | --- | --- | --- |
| | Fresh catalyst | Catalyst after use for 1000 hours | Fresh catalyst | Catalyst after use for 1000 hours | Fresh catalyst | Catalyst after use for 1000 hours |
| amount of gas produced (Nm³/Kg-Oil) | 3,460 | 3,415 | 2,107 | 1,857 | 3,401 | 2,718 |
| Composition of gas produced (percent by volume) | | | | | | |
| $CH_4$ | 1.8 | 2.1 | 5.0 | 6.2 | 1.6 | 1.9 |
| $C_2H_2$ | 0 | 0 | 0 | 0 | 0 | 0 |
| $C_2H_4$ | 0.1 | 0.1 | 3.4 | 3.8 | 0.1 | 1.0 |
| $C_2H_6$ | 0 | 0 | 0.5 | 0.6 | 0 | 0 |
| $C_3H_6$ | 0 | 0 | 0.5 | 0.7 | 0 | 0 |
| $C_4H_5$ | 0 | 0 | 0 | 0 | 0 | 0 |
| $C_4H_6$ | 0 | 0 | 0.1 | 0.2 | 0 | 0 |
| $C_4H_8$ | 0 | 0 | 0 | 0.1 | 0 | 0 |
| $H_2$ | 64.8 | 63.4 | 57.5 | 54.8 | 64.6 | 67.5 |
| CO | 11.1 | 14.9 | 15.0 | 13.8 | 13.0 | 5.8 |
| $CO_2$ | 21.9 | 19.2 | 17.6 | 19.4 | 18.4 | 24.2 |
| $H_2S$ | 0.3 | 0.3 | 0.4 | 0.4 | 0.3 | 0.3 |
| Yield of tar (percent by weight) | 3.6 | 6.8 | 29.7 | 31.6 | 3.7 | 5.4 |
| Yield of coke (percent by weight) | 24.5 | 25.7 | 10.4 | 11.7 | 25.8 | 41.7 |

The foregoing data establishes that:

(1) Degree of catalyst activity and its continuance is gasified by the fluid catalytic cracking process comprising contacting said hydrocarbon with steam at a temperature of from about 650° C. to 950° C.

4. The process of claim 1, wherein said hydrocarbon is gasified by the fluid catalytic cracking process comprising contacting said hydrocarbon with steam at a pressure of from about 0 to 10 kg/cm² (gauge).

5. The process of claim 1, wherein said hydrocarbon is gasified by the fluid catalytic cracking process comprising contacting said hydrocarbon with steam under the time for contacting the hydrocarbon feed and the catalyst of less than 10 seconds.

6. The process of claim 1, wherein said hydrocarbon is gasified by the fluid catalytic cracking process comprising contacting said hydrocarbon with steam under the weight ratio of steam to hydrocarbon of from 0.5 to 5.0.

7. The fluid catalytic cracking process for gasifying liquid and solid hydrocarbons, comprising contacting hydrocarbons with steam at a temperature of from about 700° C. to 900° C. and at a pressure of from about 0 to 5 kg/cm² (gauge), in the presence of a gasifying catalyst consisting essentially of from about 5 to 15% by weight $K_2O$, from 0.5 to 5% CaO, and from about 78 to 94.9% $Al_2O_3$ in the form of $K_2O$—CaO—$Al_2O_3$.

8. The process of claim 7, wherein said catalyst contains from 1 to 3% CaO.

* * * * *